(12) United States Patent
Gattani et al.

(10) Patent No.: US 9,722,925 B2
(45) Date of Patent: Aug. 1, 2017

(54) SYSTEM AND METHOD FOR BGP SFLOW EXPORT

(71) Applicant: Arista Networks, Inc., Santa Clara, CA (US)

(72) Inventors: Akshay K. Gattani, Mountain View, CA (US); Shuo Guo, Sunnyvale, CA (US); Yitao Wu, Fremont, CA (US); Forhad Ahmed, Newark, CA (US)

(73) Assignee: Arista Networks, Inc., Santa Clara, CA (US)

( * ) Notice: Subject to any disclaimer, the term of this patent is extended or adjusted under 35 U.S.C. 154(b) by 119 days.

(21) Appl. No.: 14/730,004

(22) Filed: Jun. 3, 2015

(65) Prior Publication Data

US 2016/0255000 A1   Sep. 1, 2016

Related U.S. Application Data

(60) Provisional application No. 62/126,334, filed on Feb. 27, 2015.

(51) Int. Cl.
*H04L 12/743* (2013.01)
*H04L 12/755* (2013.01)
*H04L 12/745* (2013.01)

(52) U.S. Cl.
CPC ........ *H04L 45/7453* (2013.01); *H04L 45/021* (2013.01); *H04L 45/748* (2013.01)

(58) Field of Classification Search
None
See application file for complete search history.

(56) References Cited

U.S. PATENT DOCUMENTS

| | | | | |
|---|---|---|---|---|
| 7,457,244 B1 * | 11/2008 | Ye | ............................ | H04L 41/12 370/230 |
| 2005/0232230 A1 * | 10/2005 | Nagami | ................... | H04L 41/12 370/351 |
| 2008/0181217 A1 * | 7/2008 | Sheppard | ................ | H04L 45/02 370/389 |
| 2009/0168648 A1 * | 7/2009 | Labovitz | ............. | H04L 12/2602 370/229 |
| 2013/0340079 A1 * | 12/2013 | Gottlieb | .............. | H04L 63/1416 726/23 |
| 2014/0280338 A1 * | 9/2014 | Metz | .................... | H04L 41/0853 707/774 |

* cited by examiner

*Primary Examiner* — Donald Mills
(74) *Attorney, Agent, or Firm* — Blakely, Sokoloff, Taylor & Zafman LLP

(57) ABSTRACT

A method and apparatus of a device that exports Border Gateway Protocol (BGP) data in sFlow samples. The device generates separate tables for BGP attribute information, community list information, and autonomous systems path (AS_PATH) attribute information, where each entry in the BGP attribute information table is associated with an entry in the community list information table and an entry in the AS_PATH attribute information table. The device further populates a BGP route information table that defines a mapping from a network address prefix to an entry in the BGP attribute information table. The device generates a sFlow sample related to the network address prefix using the BGP attribute information table, the community list information table, the AS_PATH attribute information table, and the BGP route information table.

20 Claims, 10 Drawing Sheets

SYSTEM AND METHOD FOR BGP SFLOW EXPORT

RELATED APPLICATIONS

Applicant claims the benefit of priority of prior, provisional application Ser. No. 62/126,334, filed Feb. 27, 2015, the entirety of which is incorporated by reference.

FIELD OF INVENTION

This invention relates generally to data networking, and more particularly, to exporting BGP metadata in sFlow samples.

BACKGROUND OF THE INVENTION

Border Gateway Protocol (BGP) is a standardized gateway protocol designed to exchange routing and reachability information between autonomous systems (AS) on the Internet. BGP is involved in making core routing decisions based on paths, network policies or rule-sets configured by a network administrator. BGP may be used for routing within an AS. Internet service providers can use BGP to establish routing between one another. In addition, large private Internet Protocol (IP) networks may use BGP internally.

sFlow is an industry standard for packet export at Layer 2 of the Open Systems Interconnection (OSI) model. sFlow is supported by a number of platforms and vendors. It provides complete packet header and switching/routing information that permits detailed analysis of L2-L7 traffic flows. sFlow uses sampling to achieve scalability, and thus is applicable to high speed networks. sFlow provides visibility of network usage and active routes of high-speed networks, thus providing the data required to effectively control and manage network usage. sFlow samples are sent as sFlow datagrams to a central server running the sFlow collector, which analyzes and reports on network traffic.

sFlow samples tagged with BGP metadata allow Content Delivery Networks (CDNs) to efficiently manage network resources. For example, with BGP metadata in sFlow samples, CDNs can see what path a packet is taking and adjust routing accordingly. This gives content or service providers a general idea of network traffic status and enables finer grained management of network resources and distribution of network traffic load.

Because network routes update constantly and because of the redundancy of BGP information, finding up-to-date BGP metadata for BGP routes can be a computationally intensive problem that requires a huge amount of CPU and memory resources. Accordingly, techniques for allowing efficient, CPU-optimized design and implementation that combines BGP metadata with sFlow samples are desirable.

SUMMARY OF THE DESCRIPTION

A method and apparatus of a device that exports Border Gateway Protocol (BGP) data in sFlow samples is described. In an exemplary embodiment, the device generates separate tables for BGP attribute information, community list information, and autonomous systems path (AS_PATH) attribute information, where each entry in the BGP attribute information table is associated with an entry in the community list information table and an entry in the AS_PATH attribute information table. The device further populates a BGP route information table that defines a mapping from a network address prefix to an entry in the BGP attribute information table. The device generates a sFlow sample related to the network address prefix using the BGP attribute information table, the community list information table, the AS_PATH attribute information table, and the BGP route information table.

In a further embodiment, a method and apparatus of a device that exports BGP data in sFlow samples is described. The device performs a longest prefix match using a source or destination layer 3 network address in the sFlow sample to get a network address prefix. The device looks up the network address prefix in a BGP route information table to obtain a BGP attribute information entry. The device further retrieves a community list information entry and an AS_PATH attribute information entry based on the BGP attribute information entry. The device generates a sFlow sample using the BGP attribute information entry, the community list information entry, and the BGP attribute information entry. The device further sends the sFlow sample to a sFlow collector. In one embodiment, the network address is associated with a routing path and the sFlow sample is related to the routing path.

In one embodiment, each entry in the BGP attribute information table includes a next hop address for reaching a certain destination and a local preference value. In one embodiment, each entry in the community list information table includes a list of community values. In one embodiment, each entry in the AS_PATH attribute information table includes a segment type, a segment length, and a segment data for each AS_PATH segment of an AS_PATH corresponding to the entry. In one embodiment, each entry in the BGP attribute information table references an entry in the community list information table and an entry in the AS_PATH attribute information table.

In one embodiment, the BGP attribute information table includes a partial copy of an AS_PATH hash table of a routing agent of the device and each entry in the BGP attribute information table is associated with an AS_PATH instance of the routing agent. The community list information table includes a copy of a community hash table of the routing agent. The AS_PATH attribute information table includes a copy of an AS_PATH attribute hash table of the routing agent.

Each entry in the BGP attribute information table is updated in response to the corresponding entry in the AS_PATH hash table of the routing agent being updated. In one embodiment, each entry in the BGP attribute information table is updated in response to a corresponding AS_PATH instance of the routing agent being updated. Each entry in the community list information table is updated in response to a corresponding entry in the community hash table of the routing agent being updated. Each entry in the AS_PATH attribute information table is updated in response to a corresponding entry in the AS_PATH attribute hash table of the routing agent being updated. In one embodiment, an entry in the BGP route information table is updated in response to a corresponding route of the routing agent being updated.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
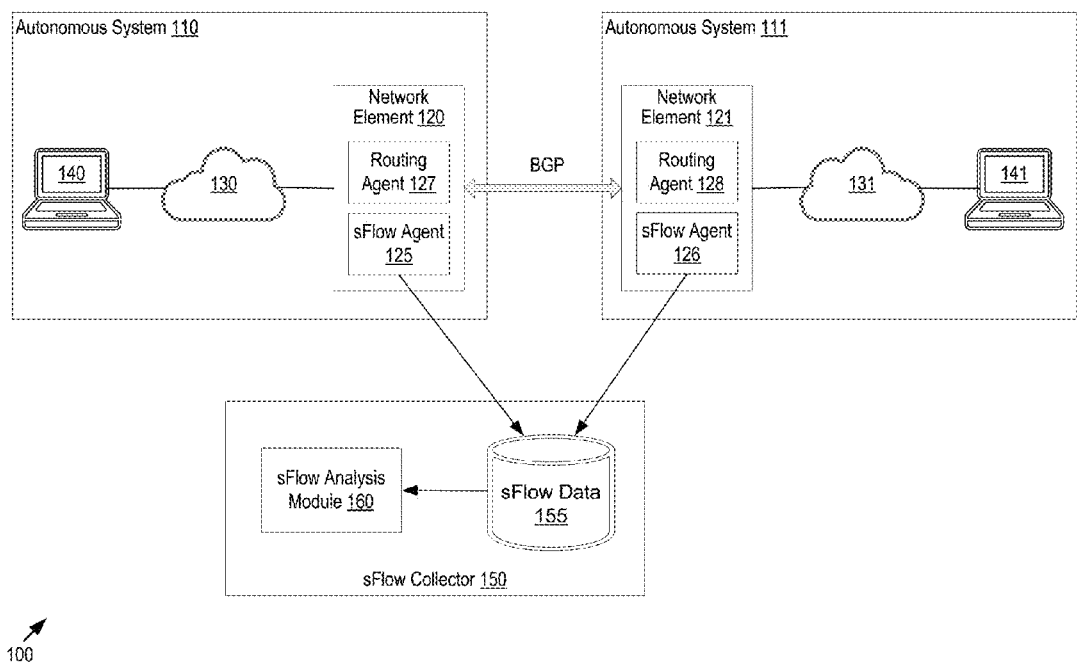
FIG. 1 is a block diagram of one embodiment of a networking system that exports BGP data in sFlow samples.

A method and apparatus of a device that exports Border Gateway Protocol (BGP) data in sFlow samples is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that exports BGP data in sFlow samples to facilitate efficient and finer grained network resource management is described. sFlow samples tagged with BGP metadata allow Internet content or service providers to efficiently manage network resources. However, because network routes are constantly updated and because of the redundancy of BGP information, retrieving BGP metadata for BGP routes can be a computationally intensive problem that requires a huge amount of CPU and memory resources. Therefore, an efficient, CPU-optimized design and implementation for combining BGP information with sFlow samples is desirable. In one embodiment, the device generates separate tables for BGP attribute information, community list information, and autonomous systems path (AS_PATH) attribute information in order to reduce redundancy in BGP data. The device further populates a BGP route information table that defines a mapping from a network address prefix to an entry in the BGP attribute information table. The device generates a sFlow sample related to the network address prefix using the BGP attribute information table, the community list information table, the AS_PATH attribute information table, and the BGP route information table.

IP addresses are divided into two parts, a network section and a host section. The network section identifies a particular network, and the host section identifies the particular node (for example, a certain computer) on the particular network. In one embodiment, a network address prefix is the network section of an IP address.

FIG. 1 is a block diagram of one embodiment of a networking system 100 that exports BGP data in sFlow samples. In one embodiment, the system 100 can be part of the Internet or can be part of a private network. In FIG. 1, system 100 includes two autonomous systems (AS) 110 and 111, and a sFlow collector 150. An autonomous system is a collection of connected Internet Protocol (IP) routing prefixes under the control of one or more network operators on behalf of a single administrative entity that presents a common, clearly defined routing policy to other networks. AS 110 includes a device 140, an internal network 130, and a network element 120. Similarly, AS 111 includes a device 141, an internal network 131, and a network element 121.

In one embodiment, the network element (e.g., 120 or 121) can be a router, switch or another type of device that can communicate with a network. In one embodiment, a router is a networking device that forwards data packets between computer networks. Using information in its routing table or routing policy, a router directs a packet the router receives to the next network on its journey. In one embodiment, a data packet is forwarded from one router to another through the networks until this data packet reaches its destination node. Network elements 120 and 121 use BGP to exchange routing and reachability information between AS 110 and AS 111. Therefore, network elements 120 and 121 are often called BGP neighbors or BGP peers.

The devices 140 and 141 communicate with the network. Each of the devices 140 and 141 can be a computer, server, smartphone, tablet, laptop, or another type of device that communicates with a network. The device 140 connects to the network element 120 through the internal network 130. As a result, the device 140 can send and receive data packets to and from network addresses inside or outside of AS 110 through the network element 120. Similarly, the device 141 connects to the network element 121 through the internal network 131. As a result, the device 141 can send and receive data packets to and from network addresses inside or outside of AS 111 through the network element 121.

Each router contains a routing agent and a sFlow agent. For instance, the network element 120 includes routing agent 127 and sFlow agent 125, and the network element 121 includes routing agent 128 and sFlow agent 126. A routing agent is a functional element in a router that provides routing capabilities to ensure that messages are routed among the correct elements in a network. In one embodiment, a routing agent is a Routing Information Base (RIB) agent that provides routing capabilities based on a routing table. In one embodiment, a sFlow agent is a software process that runs as part of the network management software within a networking device (e.g., switch/router). The sFlow agent retrieves BGP information corresponding to a sFlow sample and tags the retrieved BGP information to the sFlow sample. In one embodiment, the sFlow agent combines multiple sFlow samples into a User Datagram Protocol (UDP) sFlow datagram and sends the UDP sFlow datagram to a remote sFlow collector. For example, each of the sFlow agents 125 and 126 sends UDP sFlow datagrams to the sFlow collector 150.

The sFlow collector 150 receives sFlow datagrams from the sFlow agents 125 and 126. In one embodiment, the sFlow collector 150 performs analysis (e.g., bandwidth/traffic profiling) on the networking/routing metadata enclosed in the received sFlow datagrams. The sFlow collector 150 includes a sFlow data storage 155 and a sFlow analysis module 160. The sFlow data storage 155 stores the networking/routing metadata received through the sFlow datagrams. The sFlow analysis module 160 performs analysis on the networking/routing metadata stored in the sFlow data storage 155 in order to produce a real-time, network-wide view of traffic flows. The sFlow analysis module 160 also provides a detailed breakdown of traffic flows (e.g., "top N grouping of AS-PATH accounting for most traffic flows", "top N grouping of BGP Peers based on local preference", etc.). The sFlow analysis module 160 helps with traffic engineering, capacity planning, and supports efficient traffic peering decisions.

Figure 2:
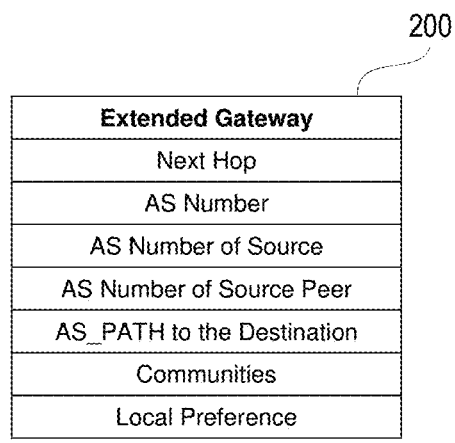
FIG. 2 illustrates one embodiment of the BGP metadata to be exported in sFlow samples.

FIG. 2 illustrates the BGP metadata to be exported in sFlow samples. In one embodiment, the BGP metadata is stored in the Extended Gateway structure 200. Each instance of the Extended Gateway structure 200 is associated with a sFlow sample. As illustrated in FIG. 2, the Extended Gateway structure 200 includes a Next Hop attribute, an AS Number attribute, an AS Number of Source attribute, an AS Number of Source Peer attribute, an AS_PATH to the Destination attribute, a Communities attribute, and a Local Preference attribute.

In one embodiment, the Next Hop attribute represents the next hop IP address that is going to be used to reach a certain destination. The AS Number attribute represents the autonomous system number of the router. The AS Number of Source attribute represents the autonomous system number of the route source, which is the oldest AS number added in the AS_PATH associated with the source IP's prefix. The AS Number of Source Peer attribute represents the autonomous system number of source peer, which is the newest AS number in the AS_PATH associated with the source IP's prefix. The AS_PATH to the Destination attribute represents the autonomous system path to the destination. The Communities attribute represents the communities associated with this route. The Local Preference attribute represents the local preference associated with this route.

In one embodiment, for each sFlow sample, a lookup for the prefix is performed in forwarding information base (FIB) based on the source and destination IP associated with the route. If the route is learned from BGP, the BGP metadata in the Extended Gateway structure 200 is added into the sFlow sample.

Figure 3:
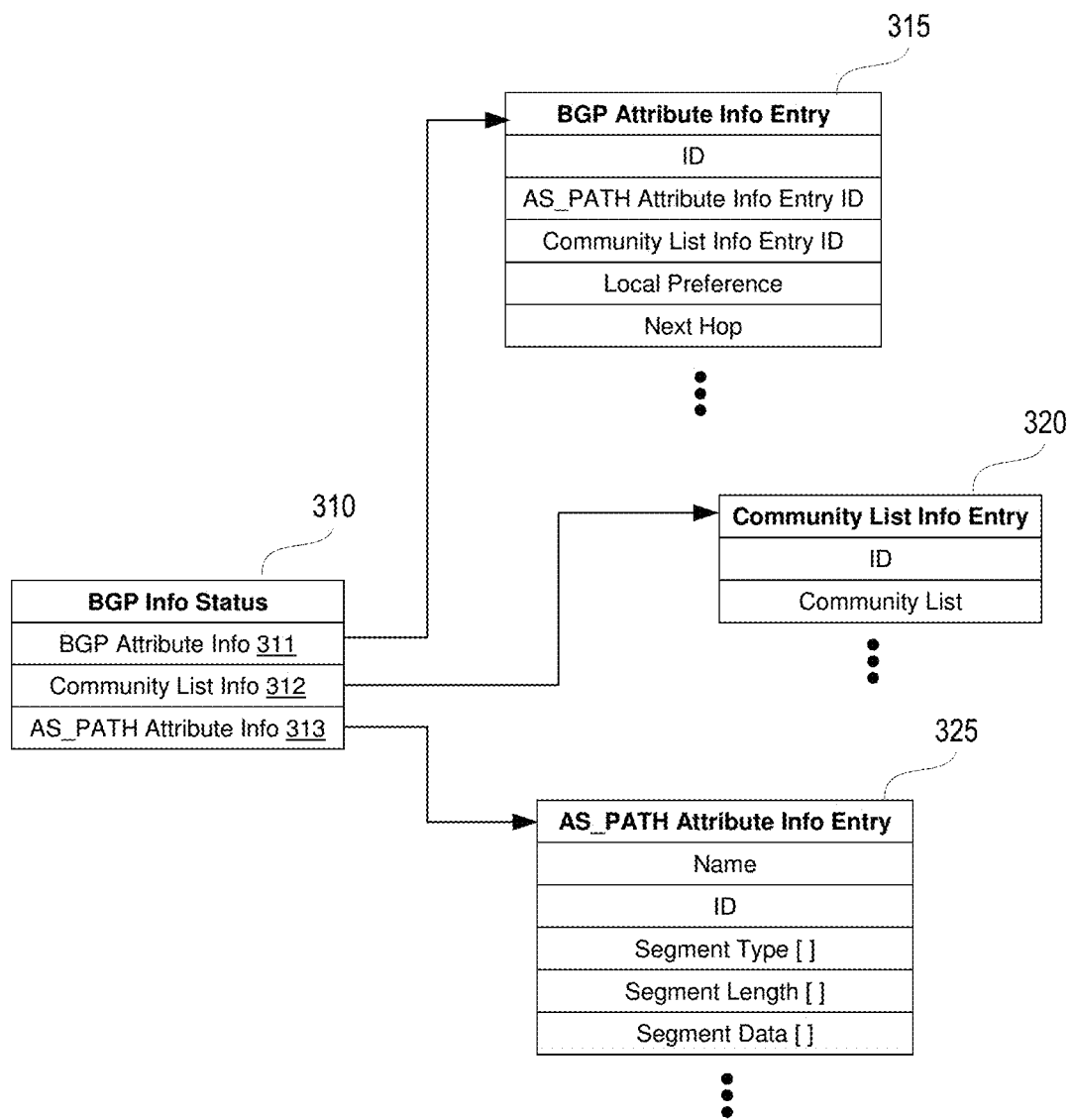
FIG. 3 illustrates one embodiment of how BGP metadata is organized in order to facilitate efficient export of BGP metadata in sFlow samples.

In order to efficiently export BGP metadata in sFlow samples, BGP metadata needs to be stored in a way that minimizes usage of CPU and memory resources. FIG. 3 illustrates how BGP metadata is organized in order to facilitate efficient export of BGP metadata in sFlow samples. Specifically, FIG. 3 illustrates BGP metadata is stored in the BGP Info Status structure 310, which includes three separate tables: BGP Attribute Info table 311, Community List Info table 312, and AS_PATH Attribute Info table 313. In one embodiment, the BGP Info Status structure 310 is stored in a system database of the router.

Each entry in the BGP Attribute Info table 311 is called a BGP Attribute Info entry 315. As illustrated in FIG. 3, a BGP Attribute Info entry contains an identification (ID) number for the entry, a Local Preference attribute, a Next Hop attribute, and identification numbers of the associated AS_PATH Attribute Info entry and Community List Info entry. The local Preference attribute represents the local preference associated with the BGP route. The Next Hop attribute represents the next hop IP address that is going to be used to reach a certain destination. The identification numbers of the associated AS_PATH Attribute Info entry and Community List Info entry are used to reference the associated AS_PATH Attribute Info entry and Community List Info entry, so that relevant information can be retrieved from them. In one embodiment, the BGP Attribute Info table 311 is a partial copy of the AS_PATH hash table managed by the routing agent. Each BGP Attribute Info entry 315 is associated with an AS_PATH instance of the routing agent.

In one embodiment, each entry in the Community List Info table 312 is called a Community List Info entry 320. As illustrated in FIG. 3, a Community List Info entry contains an identification number for the entry and a Community List attribute. The Community List attribute represents the communities associated with the BGP route. In one embodiment, the Community List Info table 312 is a copy of the community hash table managed by the routing agent.

Each entry in the AS_PATH Attribute Info table 313 is called an AS_PATH Attribute Info entry 325. As illustrated in FIG. 3, an AS_PATH Attribute Info entry contains a path name and an identification number for the entry. An AS_PATH Attribute Info entry also contains a Segment Type, a Segment Length, and a Segment Data for each AS_PATH segment of an AS_PATH corresponding to the entry. In one embodiment, the AS_PATH Attribute Info table 313 is a copy of the AS_PATH attribute hash table managed by the routing agent.

By separating BGP metadata into three tables, the objects/values of BGP metadata are de-duplicated. Thus, there will be little or no redundancy in BGP metadata. As a result, less CPU and memory resources of the router are consumed for storing and exporting BGP information that is used in sFlow samples.

In one embodiment, when generating these BGP metadata tables, entries in the lowest level table, e.g., the table that does not reference other tables, are generated first. Entries in a table that references other tables are generated when entries in the referenced other tables have been generated. For example and in one embodiment, entries in the BGP Attribute Info table 311 are generated after entries in the Community List Info table 312 and the AS_PATH Attribute Info table 313 have been generated. In one embodiment, when deleting these BGP metadata tables, entries in the highest level table are deleted first. For example and in one embodiment, entries in the BGP Attribute Info table 311 are deleted first before entries in the Community List Info table 312 and the AS_PATH Attribute Info table 313 can be deleted.

Figure 4:
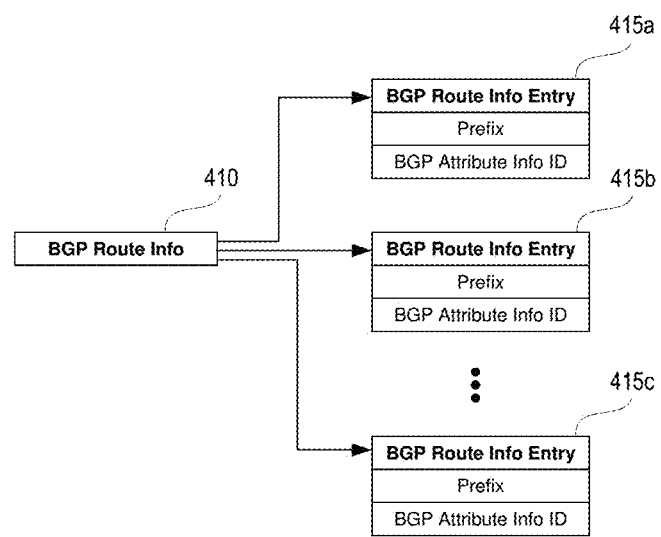
FIG. 4 illustrate one embodiment of a mapping from a network address prefix to a BGP Attribute Info entry.

In order to retrieve relevant BGP information for BGP routes, a mapping from a route to the BGP metadata is used. FIG. 4 illustrates a mapping from a network address prefix to a BGP Attribute Info entry. The mapping from a network address prefix to a BGP Attribute Info entry is stored in the BGP Route Info table 410. The BGP Route Info table 410 contains multiple entries, e.g., BGP Route Info entries 415a, 415b, and 415c. Each BGP Route Info entry contains a mapping from a network address prefix to an ID number of a BGP Attribute Info entry. Therefore, a network address prefix related to a route can be mapped to a BGP Attribute Info entry using the BGP Route Info table 410, thus retrieving relevant BGP metadata for the route. In one embodiment, the BGP Route Info table 410 is stored in a shared memory hash table for fast unblocked access of the table by a sFlow agent.

Figure 5:
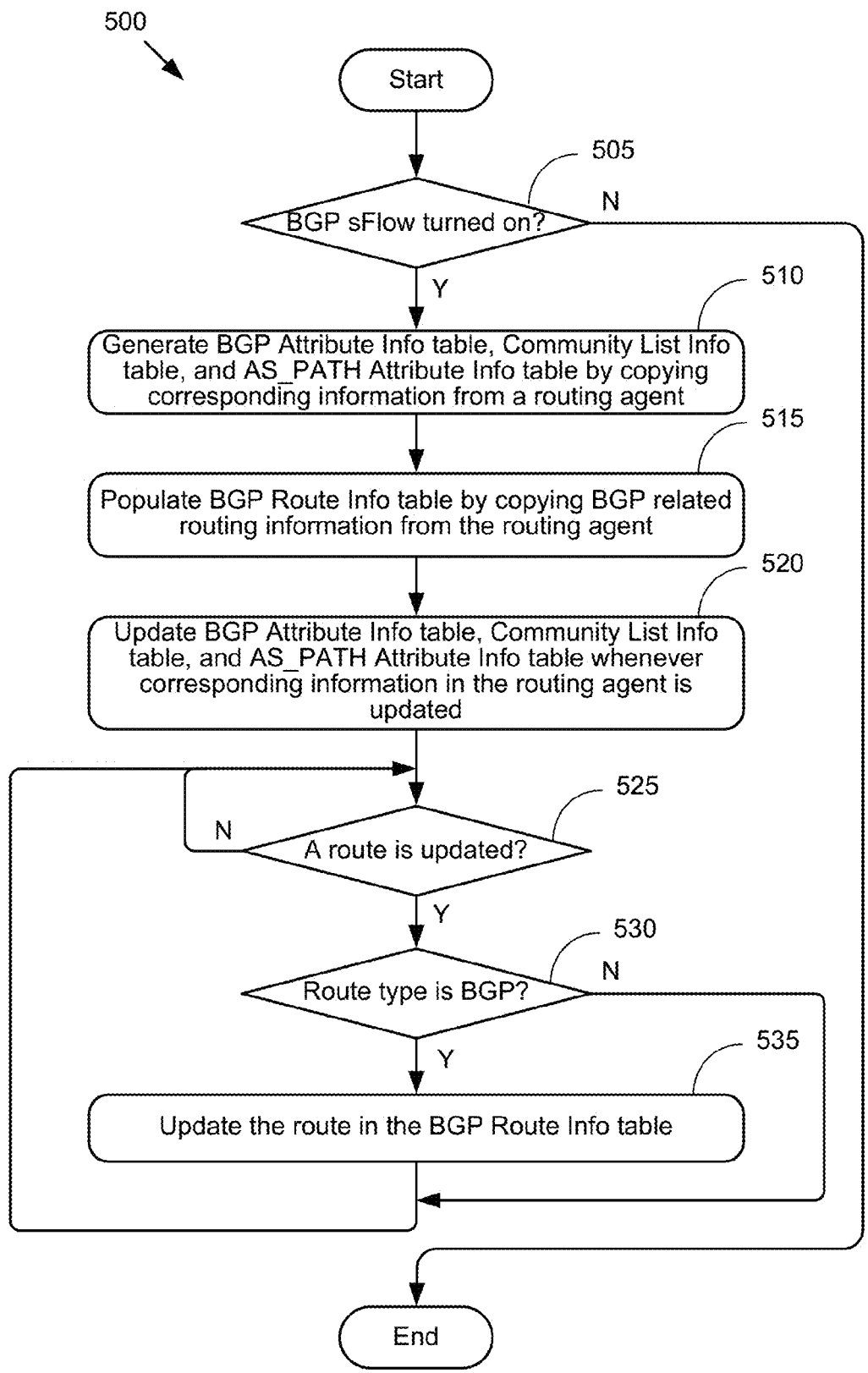
FIG. 5 illustrates a flowchart of one embodiment of a process to prepare BGP metadata for BGP sFlow export.

FIG. 5 illustrates a flowchart of one embodiment of a process 500 to prepare BGP metadata for BGP sFlow export. In one embodiment, a router executes process 500 to prepare BGP metadata for BGP sFlow export. In FIG. 5, process 500 begins by determining (at block 505) whether the BGP sFlow feature is turned on. If the BGP sFlow feature is not turned on (e.g., sFlow samples do not need to contain BGP metadata), process 500 ends.

If the BGP sFlow feature is turned on, process 500 proceeds to block 510. At block 510, process 500 generates a BGP Attribute Info table, Community List Info table, and an AS_PATH Attribute Info table by copying corresponding information from a routing agent on the router. In one embodiment, the BGP Attribute Info, Community List Info, and AS_PATH Attribute Info tables are the respective tables described in relation to FIG. 3 above. In one embodiment, the BGP Attribute Info table is a partial copy of the AS_PATH hash table managed by the routing agent. The Community List Info table is a copy of the community hash table managed by the routing agent. The AS_PATH Attribute Info table is a copy of the AS_PATH attribute hash table managed by the routing agent.

At block 515, process 500 populates BGP Route Info table by copying BGP related routing information from the routing agent. In one embodiment, the BGP Route Info table is the table 410 described in relation to FIG. 4 above.

Process 500 updates (at block 520) BGP Attribute Info table, Community List Info table, and AS_PATH Attribute Info table whenever corresponding information in the routing demon is updated. In one embodiment, an entry is added into the BGP Attribute Info table whenever an AS_PATH entry is added into the AS_PATH hash table at the routing agent. Similarly, an entry is added into the Community List Info table whenever a new entry is added into the community hash table at the routing agent, and an entry is added into the AS_PATH Attribute Info table whenever a new entry is added into the AS_PATH attribute hash table at the routing agent.

At block 525, process 500 determines whether a route is updated or flashed at the routing agent. If no route is updated or flashed, process 500 will check again at a later time. If a route is updated or flashed, process 500 determines (at block 530) whether the route type of the updated route is BGP. If the route type is not BGP, process 500 loops back to block 525 to continue checking for route updates. If the route type is BGP, process 500 proceeds to block 535.

At block 535, process 500 updates (e.g., add or delete) the route in the BGP Route Info table. Process 500 then loops back to block 525 to continue checking for route updates.

One of ordinary skill in the art will recognize that process 500 is a conceptual representation of the operations used to prepare BGP metadata for BGP sFlow export. The specific operations of process 500 may not be performed in the exact order shown and described. For example, the operations at block 515 may be performed before or in parallel with the operations at block 510, and the operations at block 525-535 may be performed before or in parallel with the operations at block 520. The specific operations may not be performed in one continuous series of operations, and different specific operations may be performed in different embodiments. Furthermore, process 500 could be implemented using several sub-processes, or as part of a larger macro process.

Figure 6:
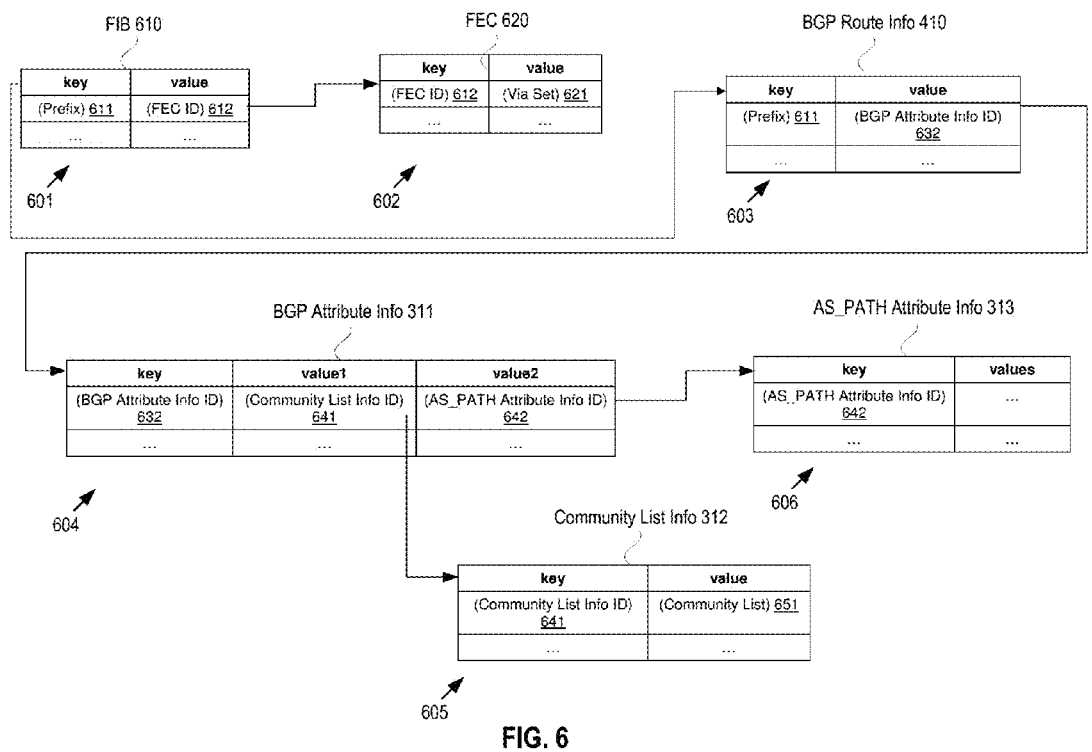
FIG. 6 illustrates a series of operations in one embodiment that retrieve BGP metadata for BGP sFlow export.

FIG. 6 illustrates a series of operations in one embodiment that retrieves BGP metadata for BGP sFlow export. Specifically, FIG. 6 illustrates that BGP metadata is retrieved for sFlow export through six stages 601-606, which map source and destination IP addresses in a sFlow sample to corresponding BGP metadata that can be exported in sFlow samples. In one embodiment, a sFlow agent executes operations of stages 601-606 to retrieve BGP metadata for BGP sFlow export.

At stage 601, a lookup is performed in the forwarding information base (FIB) 610. The FIB 610 is indexed by network address prefix 611, where the network address prefix 611 is the key for the FIB 610 table. Each network address prefix 611 in the FIB 610 is mapped to a Forwarding Equivalence Class (FEC) identifier 612. A FEC identifier 612 describes a set of packets with similar and/or identical characteristics, which may be forwarded the same way. Using the FIB 610, source and destination IP addresses of a BGP route can be mapped to a network address prefix 611 by performing a longest prefix match. In one embodiment, the network address prefix 611 is the longest prefix match to either the source or destination IP address. A FEC identifier 612 corresponding to the network address prefix 611 can then be retrieved.

At stage 602, a lookup is performed in the FEC table 620. The FEC table 620 is indexed by FEC identifier 612, where the FEC identifier 612 is the key for the FEC table 620. Each FEC identifier 612 in the FEC table 620 is mapped to a via set 621. A via set 621 contains one or more vias. In one embodiment, a via represents one way to route the packet, and is defined by a hop (e.g., an IP address) and an interface identifier that corresponds to layer 3 interface in the system. A single via in the via set means there is only a single path, a single interface to get the IP packet routed. Multiple vias in a via set means there can be different paths and/or different interfaces to get the IP packet routed. Multiple vias is an indication that network traffic can be load balanced with different vias. Using the FEC table 620, a FEC identifier 612 can be mapped to a via set 621. In one embodiment, the FEC identifier 612 is retrieved at stage 601 described above.

At stage 603, a lookup is performed in the BGP Route Info table 410. The BGP Route Info table 410 is indexed by network address prefix 611, where network address prefix 611 is the key for the BGP Route Info table 410. Each network address prefix 611 in the BGP Route Info table 410 is mapped to a BGP Attribute Info identification number 632. In one embodiment, the network address prefix 611 is the longest prefix match to the IP of a via in the via set 621 retrieved at stage 602 described above. Using the BGP Route Info table 410, a network address prefix 611 can be mapped to a BGP Attribute Info identification number 632. The BGP Attribute Info identification number 632 identifies an entry in the BGP Attribute Info table 311.

At stage 604, a lookup is performed in the BGP Attribute Info table 311. The BGP Attribute Info table 311 is indexed by BGP Attribute Info identification number 632, where the BGP Attribute Info identification number 632 is the key for the BGP Attribute Info table 311. Each BGP Attribute Info identification number 632 in the BGP Attribute Info table 311 is mapped to a BGP Attribute Info entry, which includes a Community List Info identification number 641 and an AS_PATH Attribute Info identification number 642. In one embodiment, the BGP Attribute Info entry is the BGP Attribute Info entry 315 described in relation to FIG. 3 above. In one embodiment, the BGP Attribute Info identification number 632 is retrieved at stage 603 described above. Using the BGP Attribute Info table 311, a BGP Attribute Info identification number 632 can be mapped to a Community List Info identification number 641 and an AS_PATH Attribute Info identification number 642. The Community List Info identification number 641 identifies an entry in the Community List Info table 312. The AS_PATH Attribute Info identification number 642 identifies an entry in the AS_PATH Attribute Info table 313.

At stage 605, a lookup is performed in the Community List Info table 312. The Community List Info table 312 is indexed by Community List Info identification number 641, where the Community List Info identification number 641 is the key for the Community List Info table 312. Each Community List Info identification number 641 in the Community List Info table 312 is mapped to a Community List Info entry, which includes a Community List 651. In one embodiment, the Community List Info entry is the Community List Info entry 320 described in relation to FIG. 3 above. The Community List 651 represents the communities associated with the BGP route. In one embodiment, the Community List Info identification number 641 is retrieved at stage 604 described above.

At stage 606, a lookup is performed in the AS_PATH Attribute Info table 313. The AS_PATH Attribute Info table 313 is indexed by AS_PATH Attribute Info identification number 642, where the AS_PATH Attribute Info identification number 642 is the key for the AS_PATH Attribute Info table 313. Each AS_PATH Attribute Info identification number 642 in the AS_PATH Attribute Info table 313 is mapped to an AS_PATH Attribute Info entry. In one embodiment, the AS_PATH Attribute Info entry is the AS_PATH Attribute Info entry 325 described in relation to FIG. 3 above. In one embodiment, the AS_PATH Attribute Info identification number 642 is retrieved at stage 604 described above.

In one embodiment, the sFlow agent can extract BGP metadata from the BGP Attribute Info entry retrieved at stage 604, the Community List Info entry retrieved at stage 605, and the AS_PATH Attribute Info entry retrieved at stage 606. The extract BGP metadata for the BGP route is put into a UDP datagram and sent to a sFlow collector.

Figure 7:
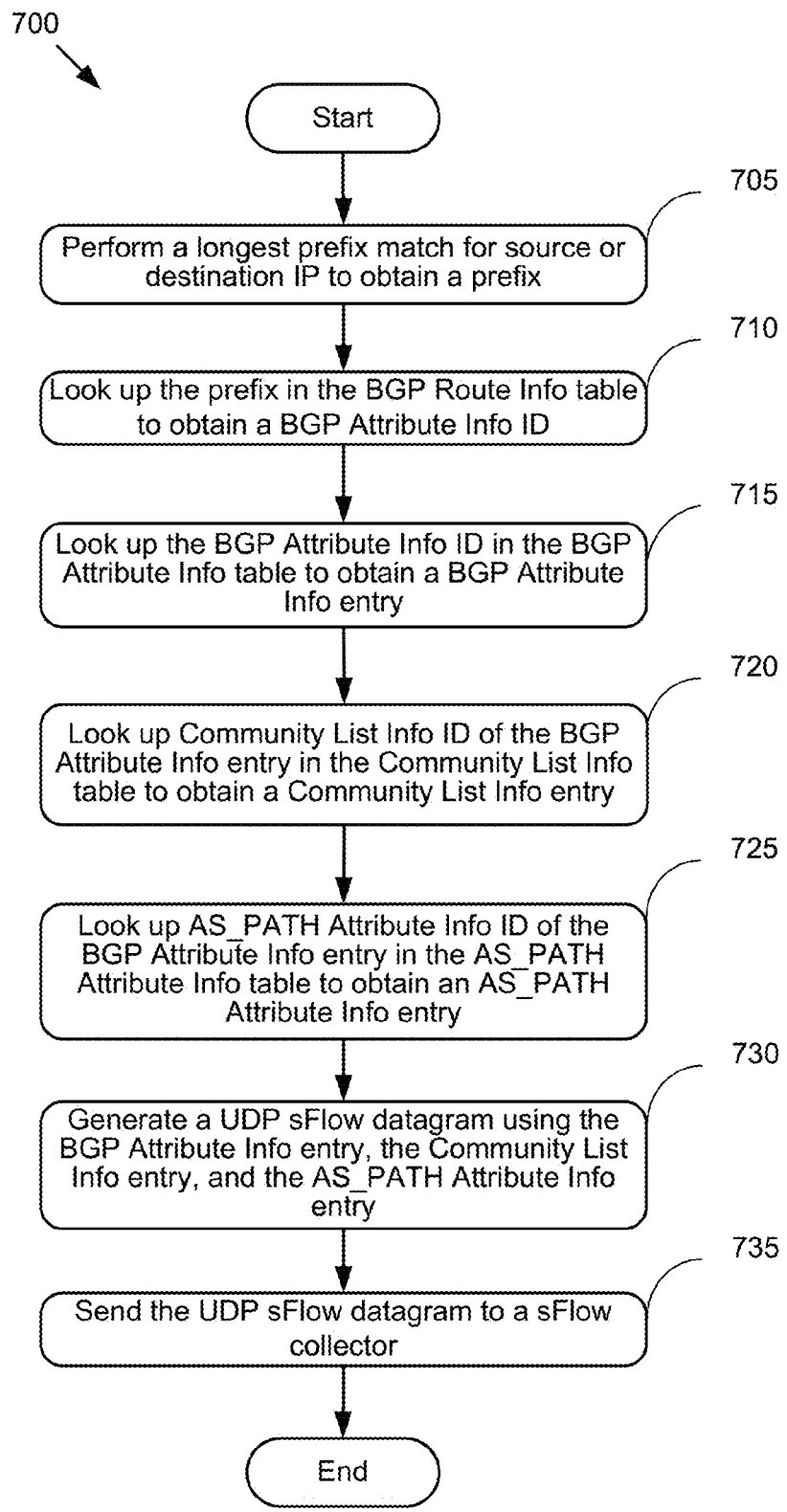
FIG. 7 illustrates a flowchart of one embodiment of a process to retrieve BGP metadata for BGP sFlow export.

FIG. 7 illustrates a flowchart of one embodiment of a process 700 to retrieve BGP metadata for BGP sFlow export. In one embodiment, a sFlow agent executes operations of process 700 to perform BGP sFlow export if the BGP sFlow feature is turned on. In FIG. 7, process 700 begins by performing (at block 705) a longest prefix match for source or destination IP addresses of a BGP route to obtain a network address prefix, which is the longest prefix match to either the source or destination IP address. In one embodiment, this network address prefix is outputted by operations of block 705. In one embodiment, a FEC identifier is retrieved from the FIB based on the network address prefix. A via set is then retrieved from the FEC table based on the FEC identifier. A new network address prefix is obtained by performing a longest prefix match for the IP address of a via in the via set. In one embodiment, the new network address prefix is outputted by operations of block 705.

At block 710, process 700 looks up the network address prefix outputted by operations of block 705 in the BGP Route Info table to obtain a BGP Attribute Info identification number. In one embodiment, the BGP Route Info table is the BGP Route Info table 410 described in relation to FIGS. 4 and 6 above. The BGP Attribute Info identification number is the BGP Attribute Info identification number 632 described in relation to FIG. 6 above. In one embodiment, if operations at block 710 fail to obtain a BGP Attribute Info identification number, the route is not a BGP route and process 700 terminates without exporting BGP metadata with the sFlow sample.

At block 715, process 700 looks up the BGP Attribute Info identification number in the BGP Attribute Info table to obtain a BGP Attribute Info entry. In one embodiment, the BGP Attribute Info entry is the BGP Attribute Info entry 315 described in relation to FIG. 3 above.

At block 720, process 700 looks up the Community List Info identification number associated with the BGP Attribute Info entry in the Community List Info table to obtain a Community List Info entry. In one embodiment, the Community List Info identification number is the Community List Info identification number 641 described in relation to FIG. 6 above. The Community List Info table is the Community List Info table 312 described in relation to FIGS. 3 and 6 above. The Community List Info entry is the Community List Info entry 320 described in relation to FIG. 3 above. In one embodiment, if the operations at block 720 fail to obtain a Community List Info entry, the Communities attributes in the BGP metadata are not populated for the sFlow sample.

At block 725, process 700 looks up the AS_PATH Attribute Info identification number associated with the BGP Attribute Info entry in the AS_PATH Attribute Info table to obtain an AS_PATH Attribute Info entry. In one embodiment, the AS_PATH Attribute Info identification number is the AS_PATH Attribute Info identification number 642 described in relation to FIG. 6 above, the AS_PATH Attribute Info table is the AS_PATH Attribute Info table 313 described in relation to FIGS. 3 and 6 above, and the AS_PATH Attribute Info entry is the AS_PATH Attribute Info entry 325 described in relation to FIG. 3 above. In one embodiment, if the operations at block 725 fail to obtain an AS_PATH Attribute Info entry, the corresponding attributes in the BGP metadata are not populated for the sFlow sample.

At block 730, process 700 generates a UDP sFlow datagram using the BGP Attribute Info entry, the Community List Info entry, and the AS_PATH Attribute Info entry. Process 700 sends (at block 735) the UDP sFlow datagram to a sFlow collector. Process 700 then terminates.

One of ordinary skill in the art will recognize that process 700 is a conceptual representation of the operations used to export BGP metadata in sFlow samples. The specific operations of process 700 may not be performed in the exact order shown and described. For example, the operations of blocks 720 and 730 may be performed in different order or in parallel. The specific operations may not be performed in one continuous series of operations, and different specific operations may be performed in different embodiments. Furthermore, process 700 could be implemented using several sub-processes, or as part of a larger macro process.

Figure 8:
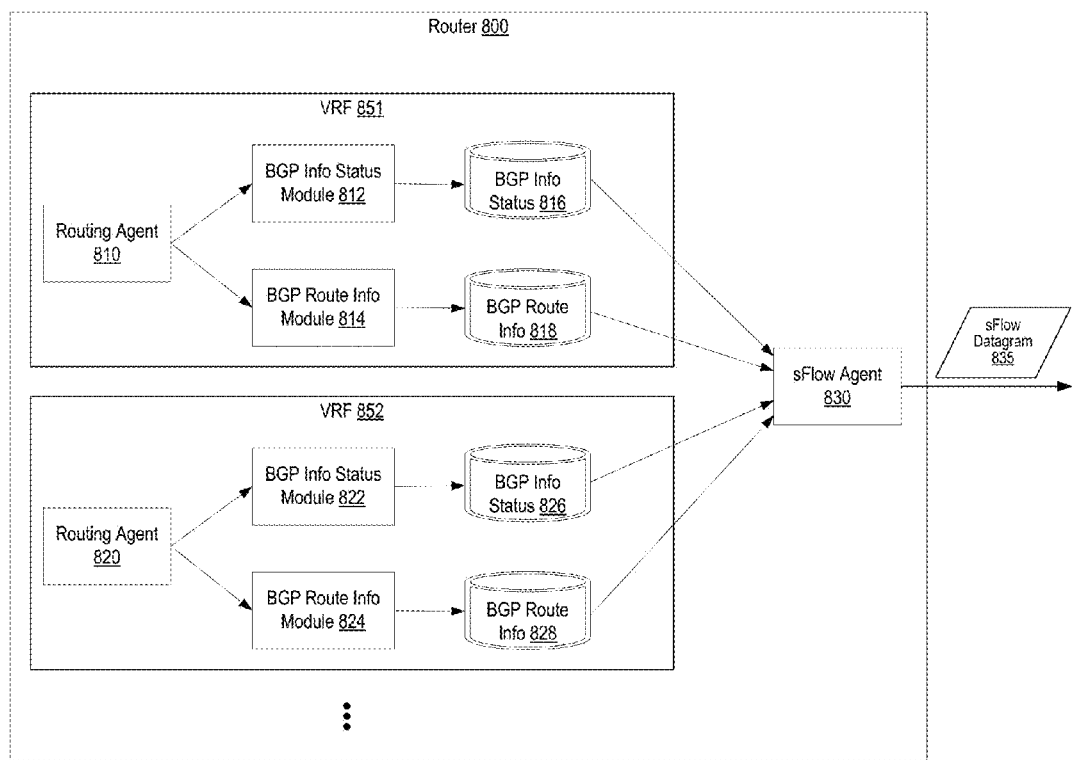
FIG. 8 illustrates one embodiment of a detailed diagram of a router of one embodiment that exports BGP metadata in sFlow samples.

FIG. 8 illustrates a detailed diagram of a router 800 of one embodiment that exports BGP metadata in sFlow samples. Specifically, this figure illustrates a set of modules for preparing and retrieving BGP metadata for sFlow export. The router 800 uses BGP to exchange routing and reachability information with another router. In one embodiment, the router 800 can be the network element 120 or 121 of FIG. 1. As shown in FIG. 8, the router 800 includes one or more virtual routing and forwarding (VRF) modules (e.g., VRF 851 and 852) and a sFlow agent 830. Multiple VRF modules allow multiple instances of a routing table to co-exist within the router 800 at the same time. In one embodiment, each VRF module can have its own routing table (e.g., FIB).

VRF 851 includes a routing agent 810, a BGP Info Status module 812, a BGP Route Info module 814, a BGP Info Status data storage 816, and a BGP Route Info data storage 818. The routing agent 810 provides routing capabilities based on a routing table (e.g., FIB). In one embodiment, the routing agent 810 can be the routing agent 127 or 128 of FIG. 1. The BGP Info Status module 812 generates BGP Info Status data by copying corresponding data from the routing agent 810, and stores the BGP Info Status data into the BGP Info Status data storage 816. In one embodiment, the BGP Info Status data is represented using the BGP Info Status structure 310 described in relation to FIG. 3 above. The Route Info module 814 generates BGP Route Info data by copying BGP related routing information from the routing agent 810, and stores the BGP Route Info data into the BGP Route Info data storage 818. In one embodiment, the BGP Route Info data is represented using the BGP Route Info table 410 described in relation to FIG. 4 above. Similarly, VRF 852 includes a routing agent 820, a BGP Info Status module 822, a BGP Route Info module 824, a BGP Info Status data storage 826, and a BGP Route Info data storage 828.

The sFlow agent 830 retrieves BGP information from BGP Info Status data storages (e.g., 816 and 826) and BGP Route Info data storages (e.g., 818 and 828), and tags the retrieved BGP information to a sFlow sample. In one embodiment, the sFlow agent 830 combines multiple sFlow samples into a sFlow datagram 835 and sends the sFlow datagram 835 to a remote sFlow collector (not shown). In one embodiment, the sFlow agent 830 can be the sFlow agent 125 or 126 of FIG. 1.

The router 800 was described above for one embodiment of the invention. One of ordinary skill in the art will realize that in other embodiments, this module can be implemented differently. For instance, in one embodiment described above, certain modules are implemented as software modules. However, in another embodiment, some or all of the modules might be implemented by hardware, which can be dedicated application specific hardware (e.g., an ASIC chip or component) or a general purpose chip (e.g., a microprocessor or FPGA).

Figure 9:
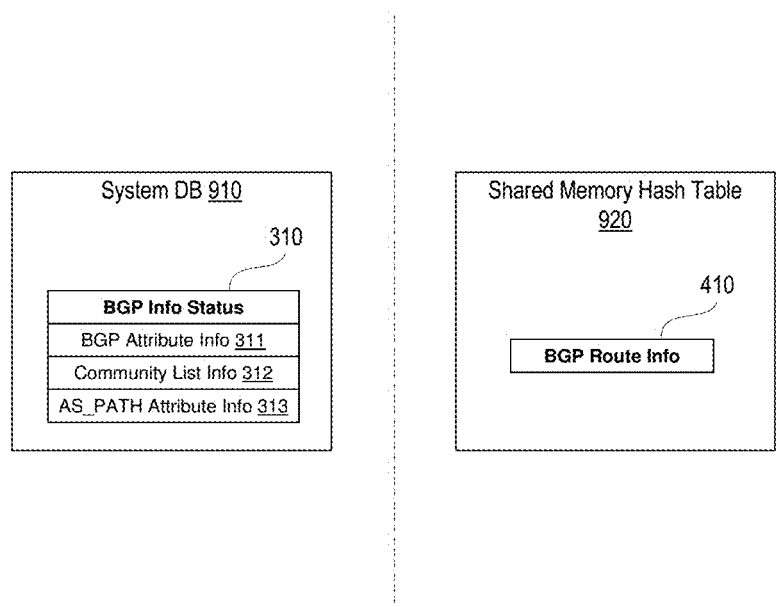
FIG. 9 illustrates one embodiment in which BGP Info Status data and BGP Route Info data are stored on different storage architectures.

FIG. 9 illustrates one embodiment in which BGP Info Status data and BGP Route Info data are stored on different storage architectures. Specifically, FIG. 9 shows that the BGP Info Status structure 310 can be stored in a system database 910 and the BGP Route Info table 410 can be stored in a shared memory hash table 920. The BGP Info Status structure 310 includes the BGP Attribute Info table 311, the Community List Info table 312, and the AS_PATH Attribute Info table 313, as described in relation to FIG. 3 above.

The system database 910 is the broker that publishes information to corresponding agents on a router. The shared memory hash table 920 allows fast and unblocked read/write of data stored on it. In one embodiment, the BGP Route Info data is updated frequently. By storing the BGP Route Info data on the shared memory hash table 920, or a similar storage device that provides fast and unblocked access of data, the export of BGP metadata in sFlow samples can be very efficient.

Figure 10:
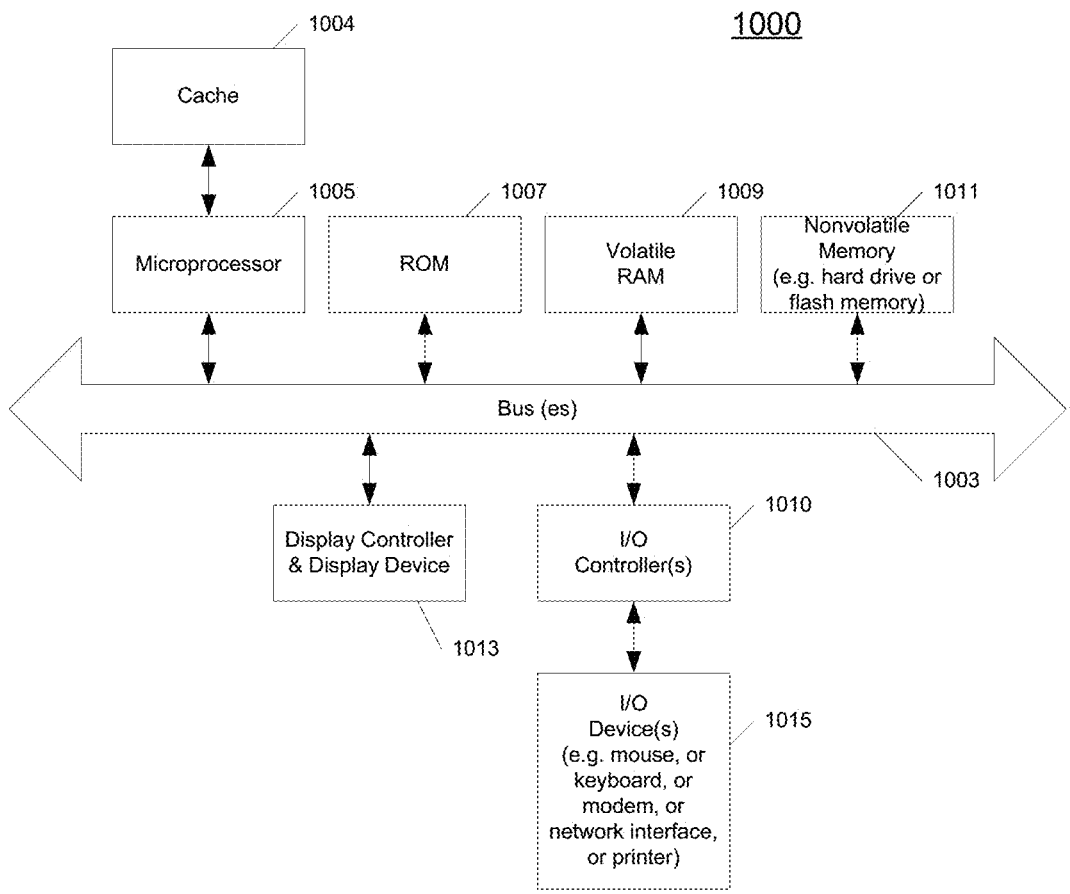
FIG. 10 illustrates one example of a data processing system, which may be used with one embodiment of the present invention.

FIG. 10 shows one example of a data processing system 1000, which may be used with one embodiment of the present invention. For example, the system 1000 may be implemented with the router 800 as shown in FIG. 8. Note that while FIG. 10 illustrates various components of a device, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the device 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 is coupled to cache memory 1004. Cache memory 1004 may be volatile or non-volatile memory. The microprocessor 1005 may retrieve the instructions from the memories 1007, 1009, 1011, and 1004, and execute the instructions to perform operations described above. The bus 1003 interconnects these various components together and also interconnects these components 1005, 1007, 1009, and 1011 to a display controller and display device 1013 and to peripheral devices such as input/output (I/O) devices 1015, which may be mice, keyboards, modems, network interfaces, printers and other devices which are well known in the art.

Typically, the input/output devices 1015 are coupled to the system through input/output controllers 1010. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1011 will also be a random access memory, although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a device bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "populating," "performing," "looking up," "retrieving," "sending," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to implement a method to export Border Gateway Protocol (BGP) data in sFlow samples, the method comprising:
generating separate tables for BGP attribute information, community list information, and autonomous systems path (AS_PATH) attribute information, each entry in the BGP attribute information table associated with an entry in the community list information table and an entry in the AS_PATH attribute information table;
populating a BGP route information table that defines a mapping from a network address prefix to an entry in the BGP attribute information table; and
generating a sFlow sample related to the network address prefix using the BGP attribute information table, the community list information table, the AS_PATH attribute information table, and the BGP route information table.

2. The non-transitory machine-readable medium of claim 1, wherein each entry in the BGP attribute information table comprises a next hop address for reaching a certain destination and a local preference value.

3. The non-transitory machine-readable medium of claim 1, wherein each entry in the community list information table comprises a list of community values.

4. The non-transitory machine-readable medium of claim 1, wherein each entry in the AS_PATH attribute information table comprises a segment type, a segment length, and a segment data for each AS_PATH segment of an AS_PATH corresponding to the entry.

5. The non-transitory machine-readable medium of claim 1, wherein each entry in the BGP attribute information table is associated with an entry in the community list information table and an entry in the AS_PATH attribute information table by referencing the entry in the community list information table and the entry in the AS_PATH attribute information table.

6. The non-transitory machine-readable medium of claim 1, wherein the BGP attribute information table comprises a partial copy of an AS_PATH hash table of a routing agent and each entry in the BGP attribute information table is associated with an AS_PATH instance of the routing agent.

7. The non-transitory machine-readable medium of claim 6, wherein the community list information table comprises a copy of a community hash table of the routing agent.

8. The non-transitory machine-readable medium of claim 6, wherein the AS_PATH attribute information table comprises a copy of an AS_PATH attribute hash table of the routing agent.

9. The non-transitory machine-readable medium of claim 6, wherein each entry in the BGP attribute information table is updated in response to the corresponding AS_PATH instance of the routing agent being updated.

10. The non-transitory machine-readable medium of claim 1, wherein an entry in the BGP route information table is updated in response to a corresponding route of a routing agent being updated.

11. A computer implemented method to export Border Gateway Protocol (BGP) data in sFlow samples, the method comprising:
   performing a longest prefix match using a network address to get a network address prefix;
   looking up the network address prefix in a BGP route information table to obtain a BGP attribute information entry stored in a BGP attribute information table;
   retrieving a community list information entry stored in a community list information table and an autonomous systems path (AS_PATH) attribute information entry stored in an autonomous systems path (AS_PATH) attribute information table based on the BGP attribute information entry, wherein the BGP attribute information table, community list information table, and autonomous systems path (AS_PATH) attribute information table are separate tables; and
   generating a sFlow sample using the BGP attribute information entry, the community list information entry, and the BGP attribute information entry.

12. The method of claim 11, wherein the method further comprises sending the sFlow sample to a sFlow collector.

13. The method of claim 11, wherein the network address is associated with a routing path and the sFlow sample is related to the routing path.

14. The method of claim 11, wherein the BGP attribute information entry comprises a next hop address for reaching a certain destination and a local preference value.

15. The method of claim 11, wherein the community list information entry comprises a list of community values.

16. The method of claim 11, wherein the AS_PATH attribute information entry comprises a segment type, a segment length, and a segment data for each AS_PATH segment of an AS_PATH corresponding to the AS_PATH attribute information entry.

17. A networking device comprising:
   a processor;
   a memory coupled to the processor though a bus; and
   a process executed from the memory by the processor which causes the processor to generate separate tables for Border Gateway Protocol (BGP) attribute information, community list information, and autonomous systems path (AS_PATH) attribute information, populate a BGP route information table that defines a mapping from a network address prefix to an entry in the BGP attribute information table, and generate a sFlow sample related to the network address prefix using the BGP attribute information table, the community list information table, the AS_PATH attribute information table, and the BGP route information table, wherein each entry in the BGP attribute information table is associated with an entry in the community list information table and an entry in the AS_PATH attribute information table.

18. The device of claim 17, wherein the BGP attribute information table comprises a partial copy of an AS_PATH hash table of a routing agent of the device and each entry in the BGP attribute information table is associated with an AS_PATH instance of the routing agent.

19. The device of claim 18, wherein each entry in the BGP attribute information table is updated in response to the corresponding AS_PATH instance of the routing agent being updated.

20. The device of claim 17, wherein an entry in the BGP route information table is updated in response to a corresponding route of a routing agent being updated.

\* \* \* \* \*